United States Patent [19]

Altemore et al.

[11] 3,899,477

[45] Aug. 12, 1975

[54] POLYMERIZATION OF ETHYLENE

[75] Inventors: Joseph M. Altemore, Dickinson; Morris R. Ort, Seabrook, both of Tex.

[73] Assignee: Monsanto Company, St. Louis, Mo.

[22] Filed: Feb. 16, 1973

[21] Appl. No.: 333,250

[52] U.S. Cl. ............... 260/94.9 B; 260/94.9 E
[51] Int. Cl. ............................................. C08f 1/52
[58] Field of Search ......... 260/94.9 E, 88.2, 94.9 R, 260/94.9 B, 94.9 C, 94.9 CD, 94.9 D

[56] References Cited
UNITED STATES PATENTS

| | | | |
|---|---|---|---|
| 3,288,768 | 11/1966 | Shiga et al. | 260/94.9 E |
| 3,308,112 | 3/1967 | Ludlum | 260/94.9 E |
| 3,766,158 | 10/1973 | Yamaguchi et al. | 260/94.9 E |

FOREIGN PATENTS OR APPLICATIONS

| | | | |
|---|---|---|---|
| 881,212 | 11/1961 | United Kingdom | 260/94.9 E |
| 2,012,697 | 3/1970 | France | 260/94.9 E |

*Primary Examiner*—M. J. Welsh
*Attorney, Agent, or Firm*—Elizabeth F. Sporar

[57] ABSTRACT

Ethylene polymers are made by bringing ethylene under polymerization conditions at low pressures into contact with a catalyst comprising a titanium halide, a vanadium halide and an organoaluminum compound. Molecular weight distribution of the polymers is controlled by reacting the titanium halide, the vanadium halide and the organoaluminum compound in such proportions that the Al/(Ti+V) ratio is between about 0.1 and 0.5 and admixing the resulting catalyst complex with a mixture of an alkylaluminum sesquiethoxide and a trialkylaluminum prior to contacting of ethylene therewith.

10 Claims, No Drawings

POLYMERIZATION OF ETHYLENE

BACKGROUND OF THE INVENTION

The present invention relates to the preparation of polymers of ethylene. More particularly, it is concerned with a catalytic system for the polymerization of ethylene whereby the physical properties of the polyethylene produced can be controlled by the simple manipulation of one component of the catalytic system.

It has been well known for some time now that ethylene and other olefins can be polymerized alone to produce homopolymers or in combination with other monomers to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetylacetonates, etc., of the metals of Groups IV-B, V-B, VI-B, VII-B and VIII of the Periodic Table. Among the more active types of catalyst for this reaction are those obtained by admixing a titanium or vanadium compound with an organoaluminum compound such as an aluminum alkyl, an alkylaluminum hydride, an alkylaluminum halide and the like. Particularly preferred are catalysts containing both vanadium and titanium halides in conjunction with organoaluminum compounds. Such catalysts are noteworthy in that their extraordinary activity appears to arise from a synergism between the vanadium and titanium components in combination. They are, accordingly, extremely valuable because of the high yields of polymers based on catalyst usage that can be obtained with them.

With the catalysts just described, high yields of good quality, high-molecular weight, solid polymers of ethylene and other olefins have been produced. Generally, these are linear polymers of high density, i.e., 0.93 and above, with the molecular weight of the polymers falling within a wide range from 2,000 to 300,000 and even as high as 3,000,000 or more. From the standpoint of density and molecular weight requirements, these polymers are satisfactory for many uses and have, in fact, in recent years found extensive commercial use in a variety of applications. However, the polymer products obtained are not always suitable for specialty uses because they have not the desired molecular weight distribution. Generally, the polymers having narrow molecular weight distribution possess higher strength but are not easily processed whereas those having comparatively broad molecular weight distribution are more easily processed but are not satisfactorily strong. A balance between molecular weight and molecular weight distribution, therefore, must be struck to obtain polymers suitable for use over a wide spectrum of applications.

The end use is usually determinative of the properties required in the high-density polyethylenes. In the manufacture of large size bottles, for example, where rigid side walls are needed for adequate performance, high molecular weight is required. If it is not of sufficiently high molecular weight, the required environmental stresscrack resistance in the presence of liquids ordinarily stored in the bottles will not be present. In addition to high molecular weight, the bottle-grade resins must possess good flow properties. Bottles are made by blow-molding in which the molten polymer is extruded in the form of a tube and the tube is then expanded by internal air pressure within the confines of a mold having the desired shape. Ordinarily, if the molecular weight is high enough, the polyethylene will often have relatively poor extrudability. This is believed to be due to the fact that the molecular weight distribution in the polymer is too narrow. Bottles prepared from such resins have an objectionable rough surface and are subject to melt fracture, adversely affecting both the appearance of the bottle and its strength characteristics.

On the other hand, in injection molding processes the resins employed are of relatively low molecular weight but these must have a narrow molecular weight distribution in order to exhibit the high strength needed for the objects made. Products with intermediate molecular weight distribution are also required where either the narrow molecular weight distribution or the broad molecular weight distribution is not suitable.

Thus, it will be seen that a method for producing linear high-density polyethylene at high yields with the polyethylene possessing the desired molecular weight in terms of melt index and molecular weight distribution characteristics fulfills a definite need in the art. It is the primary objective of the present invention to provide such a process. Other objectives and advantages of the invention will become apparent from the following description and claims.

SUMMARY OF THE INVENTION

According to the process of the invention, ethylene polymers of high molecular weight and a desired broad molecular weight distribution are produced by bringing ethylene under polymerization conditions at low pressures in contact with a catalytic system which has been prepared by reacting a titanium halide, a vanadium halide and an alkylaluminum compound to form a catalyst complex and thereafter admixing said catalyst complex with a mixture of an alkylaluminum sesquialkoxide and a trialkylaluminum, the molecular weight distribution of the polyethylene product being controlled by employing an amount of the vanadium compound so contained in said catalyst complex to provide an initial Al/(Ti + V) ratio between 0.1 and 0.5 and preferably between about 0.2 and about 0.3.

In addition to maintaining the specified ratio between the aluminum and the transition metal components in the catalyst complex, the order of addition of the components is critical. Unless the transition metal components are combined with the alkylaluminum reducing component to form a catalyst complex species and this complex is then brought together with the alkoxide and more alkylaluminum, the desired effect on polymer properties is not obtained. The addition of the alkoxide to the complexing stage results in an ineffective catalyst insofar as broad molecular weight distribution is concerned. While not wishing to be bound by any theory as to the exact nature of the catalyst, which in fact is not known, it is believed that the specified method for combining the catalytic components results in formation of two effective Ziegler-type catalysts which function individually but simultaneously in the reactor to provide sufficiently different molecular weight products resulting in a product having broadened molecular weight distribution.

DESCRIPTION OF THE PREFERRED EMBODIMENTS

The process of the invention can be carried out either in the slurry phase, that is, the catalyst is prepared and suspended in an inert reaction medium or diluent which serves as the polymerization vehicle, or in the gas phase using a fluidized solids technique with the catalyst components being deposited upon particles of solid substrate. In the slurry-phase operation, the diluent or medium employed is preferably a low-boiling one so tht trace amounts left on the polymers can be removed conventionally in a drying step. Suitable for use as inert liquid media or diluents are saturated aliphatic and alicyclic hydrocarbons, aromatic hydrocarbons and halogenated hydrocarbons. Of these the hydrocarbon solvents such a pentane, n-hexane, n-heptane, n-octane and the various isomeric hexanes, heptanes and octanes, cyclohexanes, methyl cyclopentane, dodecane and industrial solvents composed of saturated and/or aromatic hydrocarbons such as kerosene, naphtha and the like are more generally used, with the saturated aliphatic hydrocarbons having from about 5 to about 12 carbon atoms being preferred and especially preferred is n-hexane. However, benzene, toluene, ethylbenzene, cumene, decalin, ethylene dichloride, tetrachloroethane, chlorobenzene, orthodichlorobenzene, and the like can be used.

The quantity of liquid reaction medium or diluent is subject to substantial variation. The amount may be kept low in the reaction medium such as from 0.1 to 0.5 part by weight of diluent per part by weight of total polymer used. However, it is often helpful in obtaining contact between monomer and catalyst and in aiding removal of heat of reaction to employ larger amounts of the inert liquid suspending medium or diluent, for example, from about 4 to about 30 parts by weight of the liquid medium or diluent per part by weight of total polymer product.

The catalyst system of the invention is equally as useful in the gas-phase polymerization of olefins as in the slurry or liquid process. For conducting the polymerization in the gas phase using a fluidized-solids technique, the catalyst is prepared by depositing the active ingredients on a suitable substrate or support by preparing the catalyst as a solution or slurry and admixing it thoroughly with the substrate while the latter is maintained in fluidized state in suitable equipment by means of warm inert gas. The solvent is then evaporated and the catalyst dried on the substrate in the fluid bed. Deposition can be effected either at atmospheric pressure, subatmospheric pressure or at elevated pressures. Generally, the preferred substrate is finely divided or granular polymer, preferably consisting of the same type of polymer as produced in the process, namely, polyethylene. The polyethylene particles, if desired, can be mixed with other inert materials or other supports can be employed. Any inert, anhydrous materials suitable for the adsorption and/or deposition of the catalyst constituents can be used at catalyst supports provided these remain unaltered under the catalyst preparation conditions and during the polymerization process and they do not soften and/or agglomerate under such conditions. Suitable materials include, for example, hydrocarbon polymer powders, silica, calcium carbonate, calcium chloride, sodium chloride, magnesium hydroxide, magnesium chloride, charcoal, carbon black and the like. Such supports in general should have a surface area of the order of 0.1 to 800 $m^2$ or more per gram and, preferably, have surface areas in the range of 0.5 to 500 $m^2$ per gram. Particle size and surface area of the support or substrate is not critical and may be varied to suit the particular polymerization conditions being employed.

While $TiCl_4$ is the preferred titanium compound of the catalyst system in the process of the invention, other titanium tetrahalides, trihalides and mixtures of the tri- and tetrahalides can be used. Similarly, in addition to $VOCl_3$, which is the preferred vanadium compound, there can be used the corresponding bromides and iodides, or the tetrahalides of vanadium or mixture of the oxyhalides and the tetrahalides.

Any alkylaluminum compound can be employed as the reducing component with the transition metal compounds in the formation of the catalyst complex. The preferred compound is triethylaluminum, but compounds such as tributylaluminum, triisobutylaluminum, tripropyl aluminum, triphenylaluminum, trioctylaluminum, tridodecylaluminum, diisobutylaluminum hydride, isoprenyl aluminum and the like can also be employed as well as can mixtures of the foregoing types of aluminum compounds.

The alkoxide added to the polymerization vehicle is an alkyl-aluminum sesquialkoxide, that is, a 1:1 mixture of a dialkylaluminum alkoxide and an alkylaluminum dialkoxide. The alkoxides can be prepared separately and then combined or prepared in a one-step synthesis. These compounds are readily obtained by direct reaction between the hydrocarbon alcohol or phenol corresponding to the desired oxyhydrocarbyl groups and a hydrocarbyl aluminum compound corresponding to the hydrocarbyl groups desired in the composition. For example, the interaction of triethylaluminum with two moles of ethyl alcohol yields ethylaluminum diethoxide while the reaction of diisobutylaluminum hydride with one mole of isobutanol gives diisobutylaluminum isobutoxide. The reaction occurs on simple admixture of the stoichiometric amount of the alcohol and the organoaluminum compound with no catalyst and only moderate heating being required. The sesquialkoxides may be prepared in a single step by reacting 2 moles of an alkylaluminum compound with three moles of the alcohol. The hydrocarbyl group is not critical and can be any selected hydrocarbon group such as alkyl, aralkyl, aryl, alkaryl, alicyclic, bicyclic and the like hydrocarbons. Suitable groups include, for example, methyl, ethyl, propyl, isopropyl, n-butyl, isobutyl, n-pentyl, t-pentyl, hexyl, cyclohexyl, 2-methylpentyl, 2-ethylhexyl, benzyl, pinyl, phenyl, tolyl, xylyl, naphthyl, ethylphenyl, methylnaphthyl, norbornyl, and the like. Other methods of preparing the sesquialkoxides include the reaction of aluminimum alkyls with aluminum alkoxides, for example, $AlR_3 + Al(OR)_3 \rightarrow R_3Al_2(OR)_3$ or the reaction of oxygen with aluminum alkyls, e.g., $2R_3Al + 1.5O_2 \rightarrow R_3Al_2(OR)_3$.

The quantities of the components of the catalytic system of the invention can be varied. However, the Al/(Ti + V) ratio in the complexing stage must be maintained between about 0.1 and 0.5 and preferably around 0.2 to 0.3 in order to obtain a polymer having relatively broad MWD. The amount of the alkylaluminum sesquialkoxide employed is generally from about 0.5 to 12 mmoles/mmole (Ti + V) and preferably from about 0.6 to 10 mmoles/mmole (Ti + V). The alkylaluminum compound added with the sesquialkoxide may vary from 0.3 to 8 mmoles/mmoles (Ti + V) and preferably is maintained from about 0.5 to about 6 mmoles/mmole (Ti + V).

The amount of catalyst required is comparatively small. Generally, amounts from 0.1 to 5.0% by weight based on the total weight of monomer charged are satisfactory although amounts as small as 0.001% are sometimes permissible and larger amounts up to, say 20% can be employed.

The polymerization reaction can be conducted over a wide range off temperatures from 0° to 120°C and higher if desired. Preferably, reaction temperature is maintained at about 65°–115°C. Likewise, while superatmospheric pressure is preferred, subatmospheric or atmospheric pressures can be used. The applicability of the present process is not limited to any catalyst suspending medium or particular conditions of temperature and pressure under which the polymerization reaction itself is carried out.

In practicing the process of the present invention employing the slurry-phase technique, any alkyl alcohol containing from 1 to 8 carbon atoms can be employed for quenching or destruction of the catalyst after the polymerization is complete and before separation of the polymer from the reaction mixture. Of the suitable alcohols which include methyl alcohol, ethyl alcohol, propyl alcohol, isobutyl alcohol, amyl alcohol, hexyl alcohol, octyl alcohol, and the like, methyl alcohol is the preferred quenching agent. The amount of alcohol used for quenching is critical only in the sense that it must be sufficient to destroy completely all catalyst activity and may be varied widely from about 1 to about 300% of the weight of the reaction mixture of polyolefin slurry being treated. The optimum amount for use will vary according to the quantity of catalyst present in the polymerizate. Generally, amounts from about 5 to about 25% by weight of the polymer slurry are satisfactory but the amount can be controlled as desired to provide an amount of alcohol sufficient to form a slurry of satisfactory fluidity while remaining within the bounds of economical operations.

The quenching operation and recovery of the polymer may be carried out according to well known conventional procedures but is preferably conducted in the manner described and claimed in U.S. Pat. No. 3,371,078 in order to insure that in the greater part of the catalyst residues are removed from the polymer to render it less subject to color degradation on further processing.

Quenching is not usually required when the polymerization is conducted in the gas phase because catalyst residues in the polymer are generally at such a low level as to be insignificant and non-interfering in subsequent processing of the polymer.

The invention is also applicable in the preparation of copolymers and interpolymers of ethylene with other ethylenically unsaturated hydrocarbons or olefins such as propylene, butene-1, heptene-1, octadecene-1, dodecene-1, 3-methylbutene-1, styrene, vinyl cyclohexene and the like or with other monomers especially diolefins such as butadiene, isoprene, piperlyene, cyclopentadiene, 1,4-pentadiene and the like.

The invention is illustrated in the following examples which, however, are not to be construed as limiting it in any manner whatsoever.

EXAMPLE 1

A series of experiments were carried out in which ethylene was polymerized in hexane employing as a catalyst the complex formed by mixing titanium tetrachloride, $TiCl_4$, vanadium oxytrichloride, $VOCl_3$ and diisobutylaluminum hydride (DIBAH). The catalyst complex was prepared in a 100-ml glass vessel provided with a magnetic stirrer and four ports, two for nitrogens inlet and exit to assure positive nitrogen pressure on the complexer at all times, hexane inlet and catalyst component inlet. The required amounts of the catalyst components in dilute hexane solution prepared in a nitrogen-filled dry box were charged to the complexer from a syringe via the serum-capped injection port and allowed to age for about 3 minutes.

The polymerization reactor was a stirred, 2.5-liter stainless-steel jacketed vessel. The reactor was conditioned by cleaning, purging with hot nitrogen until dry and essentially oxygen-free and charging with 1500 ml of hexane to which small amounts of diethylaluminum chloride (DEAC) and trimethylaluminum (TMA) had been added. The complex mixture was then charged to the reactor by means of a stainless-steel line and the complexer was rinsed three times with hexane at ambient temperature, the hexane rinsings being drained into the reactor.

High-purity ethylene was passed through activated carbon and molecular sieve columns to a blending system. Hydrogen was introduced into the ethylene from a cylinder, pressure-regulated to 100 psig after it had been deoxygenated and dried by passage through a BTS column and a molecular sieve column and this mixture was stored in a surge tank. After addition of the catalyst complex, the reactor was brought up to a pressure of about 100 psig with the ethylene-hydrogen mixture from the tank and the reactor was heated by admitting stream to the jacket. After reactor pressure was attained, the ethylene-hydrogen feed mixture from the surge tank was switched to direct addition of these two gases to the reactor via separate rotometers at rates to maintain reactor pressure. Hydrogen content in the feed and the reactor off-gas was monitored and the hydrogen flow was adjusted to keep the concentration of hydrogen at the desired level throughout the reaction time of approximately 1 hour. Means were provided to prevent hydrogen buildup in the reactor so as to maintain the hydrogen composition in the reactor essentially independent of the reaction rate and control it at ± 5 mole per cent. Reactor temperature was controlled at about 90°C by adjustment of the steam to the reactor jacket and by use of a cold water cooling coil in the reactor.

At the end of the polymerization reaction, the slurry from the reactor was discharged into a collection vessel. The finishing steps consisted of filtration, washing and stabilization, all accomplished in a large Buchner funnel. Methanol and hexane were used for washing the polymer and a solution of a phenolic anti-oxidant was employed for stabilization. The polymer was dried prior to determination of its physical properties. Polymerization conditions and properties of the product are presented in Table 1 below. Melt index ($I_2$) was determined by ASTM Test No. D 1238-65T using a 2160-gram weight. Melt extrusion rate ($I_{10}$) was determined using the same method employed for determination of melt index except that the weight on the sample was 10 kg. ASTM Test D-792-60T was employed for determining density. Determination of molecular weight distribution was made by gel permeation chromatography. It will be seen from Table 1 that the catalyst system of Example 1 gives consistently high yields of high-density polymer but that variations in both the Al/(Ti + V) ratio and/or variations in the Ti/V ratios do not have any significant influence on the properties of the polymer obtained particularly with respect to molecular weight distribution, all polymers made having a similar narrow MWD.

lyst as compared to those made in Example 1, particularly that made in Run No. 3 which has a significantly broader molecular weight distribution than any of the other polymers.

EXAMPLE 3

Since it appeared from Example 2, that an increase in the amount of vanadium oxytrichloride employed appeared to broaden the molecular weight distribution of the polymer, a series of polymerizations was carried

TABLE 1

| Run No. | 1 | 2 | 3 | 4 | 5 | 6 | 7 |
|---|---|---|---|---|---|---|---|
| $TiCl_4$, mm/l | 0.048 | 0.048 | 0.048 | 0.048 | 0.048 | 0.048 | 0.048 |
| DIBAH, mm/l | 0.053 | 0.053 | 0.043 | 0.043 | 0.032 | 0.032 | 0.032 |
| $VOCl_3$, mm/l | 0.005 | 0.005 | 0.005 | 0.005 | 0.005 | 0.005 | 0.005 |
| Al/(Ti + V) | 1.0 | 1.0 | 0.8 | 0.8 | 0.6 | 0.6 | 0.6 |
| Ti/V | 10:1 | 10:1 | 8:1 | 8:1 | 6:1 | 6:1 | 6:1 |
| $H_2$, mol % | 74 | 78–80 | 53 | 68 | 53 | 55 | 57 |
| DEAC, mm/l | 0.25 | 0.25 | 0.25 | 0.25 | 0.25 | 0.25 | 0.25 |
| TMA, mm/l | 0.34 | 0.34 | 0.34 | 0.34 | 0.34 | 0.34 | 0.34 |
| Yield, g/g × $10^{-3}$ | 16.0 | 13.2 | 17.2 | 15.0 | 10.4 | 8.6 | 8.6 |
| MI ($I_2$) | 1.05 | 1.10 | 1.08 | 1.20 | 1.20 | 1.09 | 1.03 |
| $I_{10}/I_2$ | 11.2 | 11.5 | 11.0 | 11.7 | 10.0 | 12.0 | 12.5 |
| Density, g/cc | 0.9635 | 0.9634 | 0.9632 | 0.9641 | 0.9635 | 0.9646 | 0.9653 |
| MWD, $M_w/M_n$ | 7.7 | 7.1 | 7.4 | 7.3 | 7.0 | 7.4 | 7.7 |

EXAMPLE 2

A second series of polymerizations was conducted in which ethylaluminum sesquiethoxide (EASE) was substituted for the diethylaluminum chloride employed in Example 1 to improve chain-transfer with hydrogen and control molecular weight. The apparatus employed and the procedure were as described in Example 1. Results presented in Table 2 below show that a somewhat broader molecular weight distribution characterizes the polymers made with the alkoxide-containing catalyst as compared to those made in Example 1, particularly that made in Run No. 3 which has a significantly broader molecular weight distribution than any of the other polymers.

out as described in Example 1 wherein the amount of this catalyst component was varied. Results shown in Table 3 below clearly establish that the molecular weight distribution of the polymer can be significantly broadened and controlled by varying the amount of vanadium oxytrichloride employed in the catalyst complex in the range from about 0.010 mmole per liter to about 0.5 mmole per liter, or, stated in another manner, by maintaining the Al/(Ti + V) ratio in the range from about 0.1 to about 0.5 Runs 1 and 2 in Table 3 correspond to Runs 1 and 2 in Table 2.

TABLE 2

| Run No. | 1 | 2 | 3 | 4 | 5 | 6 |
|---|---|---|---|---|---|---|
| $TiCl_4$, mm/l | 0.048 | 0.048 | 0.048 | 0.048 | 0.048 | 0.048 |
| DIBAH, mm/l | 0.053 | 0.053 | 0.032 | 0.034 | 0.032 | 0.040 |
| $VOCl_3$, mm/l | 0.005 | 0.005 | 0.100 | 0.010 | 0.005 | 0.005 |
| Al/(Ti + V) | 1.0 | 1.0 | 0.2 | 0.6 | 0.6 | 0.75 |
| $H_2$, mol % | 60 | 60 | 50 | 51 | 55 | 55 |
| EASE, mm/l | 0.61 | 0.61 | 0.61 | 0.60 | 0.61 | 0.60 |
| TMA, mm/l | 0.34 | 0.34 | 0.34 | 0.34 | 0.34 | 0.34 |
| Yield, g/g × $10^{-3}$ | 11.0 | 12.0 | 13.2 | 12.0 | 8.7 | 0.42 |
| MI ($I_2$) | 0.68 | 0.72 | 2.0 | 0.91 | 0.88 | 13.2 |
| $I_{10}/I_2$ | 12.5 | 12.1 | 22.0 | 12.1 | 11.4 | |
| Density | 0.9650 | 0.9647 | 0.9703 | 0.9656 | 0.9647 | 0.9647 |
| MWD, $M_w/M_n$ | 11.3 | 10.4 | 22.8 | 13.3 | — | 11.1 |

TABLE 3

| Run No. | 1 | 2 | 3 | 4 | 5 | 6 | 7 | 8 |
|---|---|---|---|---|---|---|---|---|
| $TiCl_4$, mm/l | 0.048 | 0.048 | 0.053 | 0.048 | 0.053 | 0.048 | 0.048 | 0.053 |
| DIBAH, mm/l | 0.053 | 0.053 | 0.053 | 0.032 | 0.053 | 0.032 | 0.032 | 0.053 |
| $VOCl_3$, mm/l | 0.005 | 0.005 | 0.010 | 0.100 | 0.530 | 0.067 | 0.133 | 0.133 |
| Al/(Ti + V) | 1.0 | 1.0 | 0.8 | 0.2 | 0.09 | 0.3 | 0.2 | 0.3 |
| $H_2$, mol % | 60 | 60 | 51 | 50 | 50 | 14 | 12 | 12 |
| EASE, mm/l | 0.61 | 0.61 | 0.61 | 0.60 | 0.61 | 0.61 | 0.61 | 0.61 |
| TMA, mm/l | 0.34 | 0.34 | 0.34 | 0.34 | 0.34 | 0.34 | 0.34 | 0.34 |
| Yield, g/g × $10^{-3}$ | 11.0 | 12.0 | 13.6 | 13.2 | 10.0 | 12.0 | — | 10.0 |
| MI ($I_2$) | 0.68 | 0.72 | 0.91 | 2.0 | 7.0 | 0.4 | 0.48 | 0.45 |
| $I_{10}/I_2$ | 12.5 | 12.1 | 12.1 | -- | 15.0 | 17.2 | 16.7 | 19.3 |
| Density, g/cc | 0.9650 | 0.9647 | 0.9656 | 0.9703 | -- | 0.9669 | 0.9669 | 0.9678 |
| MWD, $M_w/M_n$ | 11.3 | 10.4 | 13.3 | 22.8 | 13.2 | 17.1 | 21.0 | 27.5 |

EXAMPLE 4

Another series of polymerizations was conducted in which (1) the diisobutylaluminum hydride of the catalyst complex used in Examples 2 and 3 was replaced by trietylaluminum (TEA) and (2) the trimethylaluminum added to the reactor in Examples 2 and 3 was replaced by triethylaluminum (TEA). Results presented in Table 4 show that with these substitutions, the molecular weight distribution of the polymer remains broad provided the amount of the vanadium component in the catalyst is controlled within specified limits.

EXAMPLE 5

Another series of polymerizations was conducted using the same apparatus and method employed in the previous examples to determine the effect of changing the order in which the various catalyst components are brought together. In Runs 1, 2 and 5 the $TiCl_4$, TEA, $VOCl_3$ and EASE were all reacted together in the complexer prior to introduction into the reactor containing additional TEA in the hexane solvents whereas Runs 3, 4, 6 and 7 were conducted according to the method of the invention, i.e., the ethoxide component was added with the TEA to the hexane in the reactor and not in the catalyst complex formation stage. Results are presented in Table 5. A comparison of Runs 1 and 2 with 3 and 4 and of Runs 5 with Runs 6 and 7 will show that broad molecular weight distribution was not realixed except by use of the process of the invention described herein which specifies addition of the catalytic components in a certain order. Although MWD values are not presented for the runs made, the $I_{10}/I_2$ values, which it will be seen from this and the foregoing tables generally follow the MWD values, are clearly indicative of the differences in molecular weight distribution above-mentioned.

EXAMPLE 6

Another series of polymerization runs was made in which (1) diethylaluminum ethoxide (DEAE) prepared in situ in the reactor by the reaction of ethyl alcohol with TEA and substituted for the EASE employed in the previous examples (Runs 1 and 2), (2), EASE prepared in situ in the reactor (Runs 3 and 4) was used and (3) EASE as received from the manufacturer (Runs 5 and 6) was also employed for comparative purposes. The procedure employed and the polymerization conditions were essentially the same as those described in the previous examples. Results of these runs are presented in Table 6. From the data therein, it will be seen that the DEAE is not equivalent to the EASE in the catalyst composition since the polymers produced with the catalyst containing this component do not have the broad MWD of those polymers produced when the catalyst contains the sesquiethoxide.

EXAMPLE 7

A catalyst was prepared for polymerization of ethylene in gas phase. About 600 cc of polyethylene powder was sieved to remove particles larger than 30 mesh. This polyethylene was charged to a cylindrical vessel and fluidized by passage of hot nitrogen therethrough for at least 1 hour. Bed temperature was maintained at 50°–60°C. A solution of 14 mmoles of EASE and 6 mmoles of TEA in approximately 40 ml of hexane was added to dropwise to the fluidized polyethylene and the hexane was evaporated.

TABLE 4

| Run No. | 1 | 2 | 3 | 4 | 5 | 6 | 7 | 8 | 9 | 10 | 11 | 12 |
|---|---|---|---|---|---|---|---|---|---|---|---|---|
| $TiCl_4$, mm/l | 0.048 | 0.048 | 0.048 | 0.048 | 0.024 | 0.024 | 0.024 | 0.024 | 0.024 | 0.024 | 0.024 | 0.024 |
| DIBAH, mm/l | 0.032 | 0.032 | 0.032 | 0.032 | 0.016 | | | | | | | |
| TEA | | | | | | 0.016 | 0.016 | 0.016 | 0.016 | 0.016 | 0.012 | 0.012 |
| $VOCl_3$, mm/l | 0.067 | 0.133 | 0.133 | 0.133 | 0.067 | 0.067 | 0.067 | 0.035 | 0.033 | 0.033 | 0.035 | 0.035 |
| Al/(Ti + V) | 0.3 | 0.2 | 0.2 | 0.2 | 0.2 | 0.2 | 0.2 | 0.3 | 0.3 | 0.3 | 0.2 | 0.2 |
| $H_2$, mol % | 14 | 12 | 15 | 17 | 18 | 15 | 15 | 16 | 17 | 16–18 | 15–16 | 13 |
| EASE, mm/l | 0.6 | 0.61 | 0.6 | 0.61 | 0.30 | 0.30 | 0.30 | 0.30 | 0.30 | 0.30 | 0.30 | 0.30 |
| TMA, mm/l | 0.34 | 0.34 | | 0.34 | | | | | | | | |
| TEA | | | 0.34 | | 0.17 | 0.17 | 0.17 | 0.17 | 0.17 | 0.17 | 0.17 | 0.17 |
| Yield, g/g × 10³ | 12.0 | | 14.2 | | 8.3 | | 10.3 | 12.0 | 20.0 | 17.9 | 12.2 | 14.5 |
| MI ($I_2$) | 0.38 | 0.72 | 0.30 | 1.86 | 0.5 | 0.5 | 0.41 | 0.84 | 0.4 | 0.4 | 0.08 | 14.5 |
| $I_{10}/I_2$ | 17.0 | 15.0 | 14.0 | 16.0 | 15.4 | 15.2 | 15.7 | 15.4 | 16.2 | 16.0 | 15.1 | 16.3 |
| Density g/cc | 0.9669 | | 0.9661 | 0.9696 | 0.9668 | 0.9666 | 0.9664 | 0.9669 | 0.9665 | 0.9663 | 0.9682 | 0.9664 |
| MWD $M_w/M_n$ | 17.1 | 17.1 | 18.1 | 17.8 | 18.1 | 19.6 | 23.3 | 18.6 | 23.4 | 20.4 | 20.7 | 20.3 |

TABLE 5

| Run No. | 1 | 2 | 3 | 4 | 5 | 6 | 7 |
|---|---|---|---|---|---|---|---|
| $TiCl_4$, mm/l | 0.024 | 0.016 | 0.016 | 0.016 | 0.024 | 0.024 | 0.024 |
| TEA | 0.012 | 0.012 | 0.012 | 0.012 | 0.016 | 0.016 | 0.016 |
| $VOCl_3$, mm/l | 0.034 | 0.034 | 0.034 | 0.034 | 0.033 | 0.035 | 0.033 |
| Al/(Ti + V) | 0.2 | 0.2 | 0.2 | 0.2 | 0.3 | 0.3 | 0.3 |
| $H_2$, mol % | 30 | 30 | 31 | 31 | 18 | 16 | 17 |
| EASE | 0.30 | 0.30 | 0.30 | 0.30 | 0.30 | 0.30 | 0.30 |
| TEA, mm/l | 0.130 | 0.130 | 0.130 | 0.130 | 0.166 | 0.17 | 0.17 |
| MI ($I_2$) | 0.52 | 0.18 | 2.00 | 3.30 | 0.18 | 0.84 | 0.40 |
| $I_{10}/I_2$ | 11.5 | 10.0 | 16.3 | 16.3 | 9.1 | 15.4 | 16.2 |

TABLE 6

| Run No. | 1 | 2 | 3 | 4 | 5 | 6 |
|---|---|---|---|---|---|---|
| $TiCl_4$, mm/l | 0.024 | 0.024 | 0.024 | 0.024 | 0.024 | 0.024 |
| TEA, mm/l | 0.016 | 0.016 | 0.016 | 0.016 | 0.016 | 0.016 |
| $VOCl_3$, mm/l | 0.035 | 0.035 | 0.035 | 0.035 | 0.035 | 0.035 |
| Al/(Ti + V) | 0.3 | 0.3 | 0.3 | 0.3 | 0.3 | 0.3 |
| DEAE, mm/l | 0.30 | 0.30 | | | | |
| ROH/TEA | 0.3/0.3 | 0.3/0.3 | 0.2/0.31 | 0.3/0.47 | | |
| EASE, mm/l | | | 0.20 | 0.30 | 0.30 | 0.30 |
| $H_2$, mol % | 20 | 27 | 19 | 21 | 22 | 16–17 |
| TEA, mm/l | 0.17 | 0.17 | 0.11 | 0.17 | 0.17 | 0.17 |
| MI ($I_2$) | 0.11 | 0.46 | 0.34 | 0.28 | 1.20 | 0.52 |
| $I_{10}/I_2$ | 10.0 | 9.8 | 13.5 | 13.2 | 13.5 | 15.5 |

To a glass vessel protected from the atmosphere, there was charged 1 mmole $TiCl_4$, 2 mmoles $VOCl_3$ and 0.8 mmoles of TEA (Al/Ti + V = 0.3) and the mixture was stirred at ambient temperature for 10 minutes. The resulting complex was then added dropwise to the fluidized polyethylene on which the EASE and the TEA had already been deposited. The hexane was then evaporated to produce the dry catalyst supported on polyethylene.

Polymerization of ethylene in the vapor phase using the catalyst as prepared above was carried out in a bench-scale unit comprising a polymerization reactor, at heat exchanger and the necessary accessory equipment. The jacketed reactor was generally of cylindrical configuration and of such size as to contain fluidized catalyst particles in a bed approximately 4 in. in diameter and 2.5–3 ft. in depth. At the top of the catalyst bed section, the reactor expanded in the form of an inverted cone into a disengaging section of larger diameter where any entrained particles in the unreacted gas were separated and fell back down into the bed. Recycle gas was continuously introduced at the bottom of the reactor at a rate sufficient to maintain the particles in the bed in a highly agitated state so as to create a dense phase therein. Make-up ethylene and hydrogen were introduced into the recycle gas line while fresh catalyst particles were fed into the reactor from the top. The polymer product was withdrawn from the bottom of the reactor. Unreacted gas, that is, recycle gas, from the top of the disengaging zone was led through a heat exchanger to maintain a predetermined temperature before being returned to the catalyst bed.

The catalyst prepared as described above was charged semi-continuously to the reactor maintained at a pressure of 500 psi while ethylene containing 15 mole % hydrogen was recycled continuously into the fluidized bed and product was continuously withdrawn at a rate of 1 pph as described above. Reaction temperature in the reactor bed was maintained at approximately 85°C.

The reactor was operated in the above-described manner using several batches of catalyst until a sizeable amount of product polyethylene had been obtained. Polyethylene products collected over given intervals of time were composited by homogenizing in a Banbury mixer and the composite product was analyzed and found to have a melt index ($I_2$) of 1.2, an $I_{10}$ of 23.3, and $I_{10}/I_2$ of 19.4, a MWD of 18.4 and a density of 0.9657.

EXAMPLE 8

Ethylene was polymerized as described in Example 7 using approximately 33% $H_2$ and a catalyst prepared in the same manner but containing 24 mmoles of EASE, and 12 mmoles of TEA deposited on the polyethylene substrate prior to addition of the complex solution containing 1 mmol of $TiCl_4$, 3 mmoles of $VOCl_3$ and 3 mmoles of TEA. With this catalyst having an Al/(Ti + V) ratio of 0.75, the polyethylene product obtained had an $I_2$ of 1.0, an $I_{10}$ of 12 and an $I_{10}/I_2$ of 12 indicating a narrower MWD than that obtained in Example 7.

EXAMPLE 9

A catalyst for gas-phase polymerization was prepared as described in Example 7 except that the polyethylene substrate was first treated with a suspension of 1 mmol of $TiCl_4$ and 0.8 mmole of TEA in hexane. Thereafter, a complex solution of 24 mmoles of EASE, 4 mmoles of $VOCl_3$ and 12 mmoles of TEA in hexane was added dropwise to the previously coated polyethylene substrate and the catalyst dried as before. Polymerization of ethylene with this catalyst having an Al/(Ti + V) ratio of 0.42 in the presence of 23–25% hydrogen yielded a product having an $I_2$ of 0.4, and $I_{10}$ of 4.0 and an $I_{10}/I_2$ of 10.0. As in the case of slurry polymerization, the MWD as indicated by the $I_{10}/I_2$ value was not broad as that obtained when the EASE is not complexed with the transition metal component.

What is claimed is:

1. In a process for producing polyethylene by bringing ethylene under polymerization conditions at low pressures in contact with a catalyst comprising a titanium halide, a vanadium halide and an organoaluminum compound, the improvement which comprises controlling the molecular weight distribution of said polyethylene by using a catalyst prepared by reacting said titanium halide, said vanadium halide and said organoaluminum compound in such proportions that the Al/(Ti + V) ratio is between about 0.1 and about 0.5 to form a catalyst complex and thereafter admixing said catalyst complex with a mixture of an alkylaluminum sesquialkoxide and a trialkylaluminum prior to contacting ethylene therewith.

2. The process of claim 1 wherein said titanium halide is titanium tetrachloride and said vanadium compound is vanadium oxytrichloride.

3. The process of claim 2 wherein said organoaluminum compound is diisobutylaluminum hydride.

4. The process of claim 2 wherein said organoaluminum compound is triethylaluminum.

5. The process of claim 3 wherein said alkylaluminum sesquialkoxide is ethylaluminum sesquiethoxide.

6. The process of claim 4 wherein said alkylaluminum sesquialkoxide is ethylaluminum sesquiethoxide.

7. The process of claim 5 wherein said trialkylaluminum is trimethylaluminum.

8. The process of claim 6 wherein said trialkylaluminim is triethylaluminum.

9. The process of claim 7 wherein said Al/(Ti + V) ratio of said catalyst complex is from about 0.2 to about 0.3.

10. The process of claim 8 wherein the amount of ethylaluminum sesquiethoxide is in the range from about 0.6 to about 10 mmoles per mmole (Ti + V) and the amount of trialkylaluminum is from about 0.5 to about 6 mmoles per mmole (Ti + V).

* * * * *